Figure 5:
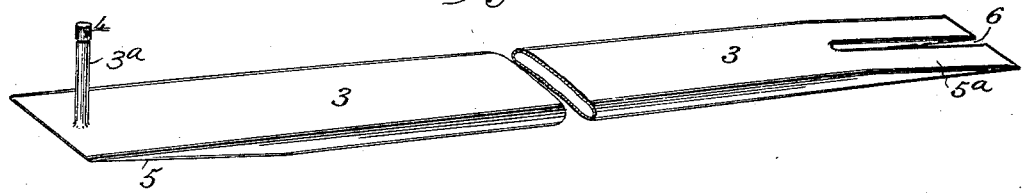

No. 668,994. Patented Feb. 26, 1901.
J. B. MAHANA & A. A. POMPE.
TIRE FOR VEHICLES.
(Application filed Sept. 13, 1900.)
(No Model.) 2 Sheets—Sheet 1.
Fig. 1.
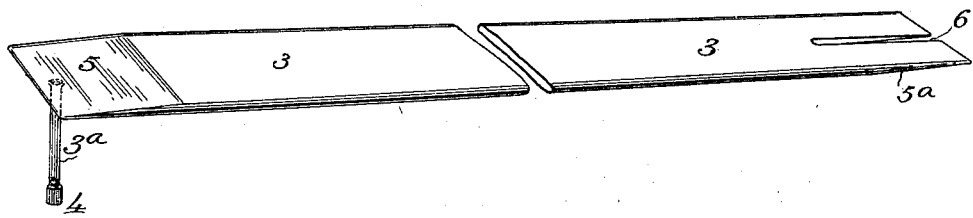
Fig. 2.
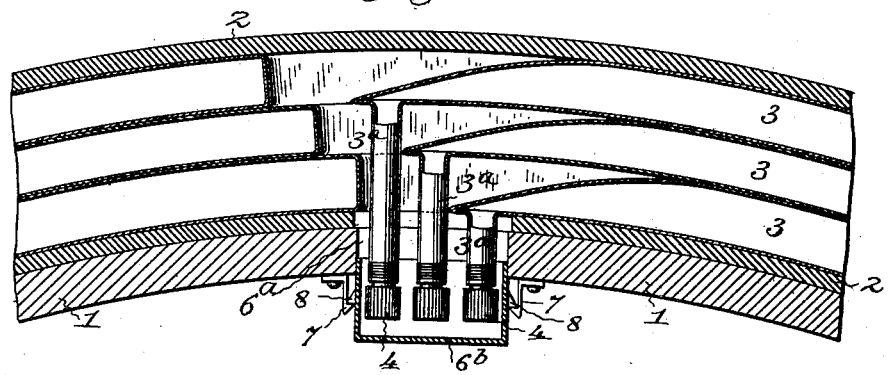
Fig. 3. Fig. 4.
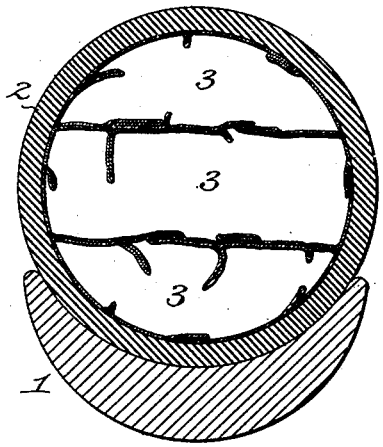 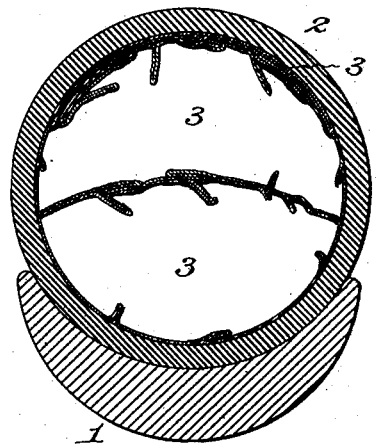
Witnesses
Sidney P. Hollingsworth
C. B. Bull
Inventors
John B. Mahana,
Adrian A. Pompe,
by W. W. T. Howard, Attorneys.
THE NORRIS PETERS CO., PHOTO-LITHO., WASHINGTON, D. C.

No. 668,994. Patented Feb. 26, 1901.
J. B. MAHANA & A. A. POMPE.
TIRE FOR VEHICLES.
(Application filed Sept. 13, 1900.)
(No Model.) 2 Sheets—Sheet 2.

Witnesses
Inventors

THE NORRIS PETERS CO., PHOTO-LITHO., WASHINGTON, D. C.

UNITED STATES PATENT OFFICE.

JOHN B. MAHANA AND ADRIAN A. POMPE, OF TOLEDO, WASHINGTON.

TIRE FOR VEHICLES.

SPECIFICATION forming part of Letters Patent No. 668,994, dated February 26, 1901.

Application filed September 13, 1900. Serial No. 29,943. (No model.)

*To all whom it may concern:*

Be it known that we, JOHN B. MAHANA and ADRIAN A. POMPE, citizens of the United States, residing at Toledo, in the county of Lewis and State of Washington, have invented certain new and useful Improvements in Tires for Vehicles, of which the following is a specification, reference being had to the accompanying drawings, and to the numerals of reference marked thereon.

Our invention relates more particularly to improvements in tires for the wheels of bicycles, light road-wagons, racing-sulkies, automobiles or other vehicles in which wheels having pneumatic tires are employed; and its object is to render the tire more useful and serviceable by adapting it to be quickly, automatically, and effectively repaired in the event of puncture.

In carrying out our invention we use, in connection with an outer tire of any ordinary or approved construction, a series of subdividing inner tubes, each one independent of the others and adapted to be separately inflated, each of said subdividing-tubes being provided with a nipple closed with a cap, the ends of each of said subdividing-tubes being constructed in a manner hereinafter described, whereby they may be lapped or fitted together, and provision being made for the proper assemblage, disposition, and concealment of the nipples of the series of lapped tubes when in place within the outer tire. Each of said subdividing-tubes, which may be made of any thin inelastic or elastic substance, is intended when fully inflated or expanded to fill the entire inner cavity of the outer tire, so that should the outer one of the said series of inner subdividing-tubes become punctured by the passage of a sharp substance through the outer tire into it said outer subdividing-tube on collapsing by the escape of air will allow the expansion of the second or next adjacent subdividing-tube, thus causing the outer portion of said expanded tube to press against the collapsed tube and reëstablish the effect of the pneumatic pressure within the tire to the extent of sufficiently maintaining the solidity and effectiveness of the tire. Thus the action of repair is practically automatic so long as one of the said inner subdividing-tubes remains intact, the pressure put upon each of said inner tubes being such that any one of them alone when expanded so as to fill the inner cavity of the outer tire shall be enough to afford or preserve a working pressure sufficient to prevent the disabling of the wheel. It will be seen that the collapsed inner tube after the exhaustion of air therefrom by puncture acts as a reinforce to the thickness of the outer tire and that in the event of the collapse of two of said inner subdividing-tubes a double reinforce is obtained.

Having thus briefly described the object and nature of our invention, reference is now made to the accompanying drawings, in which—

Figure 6:
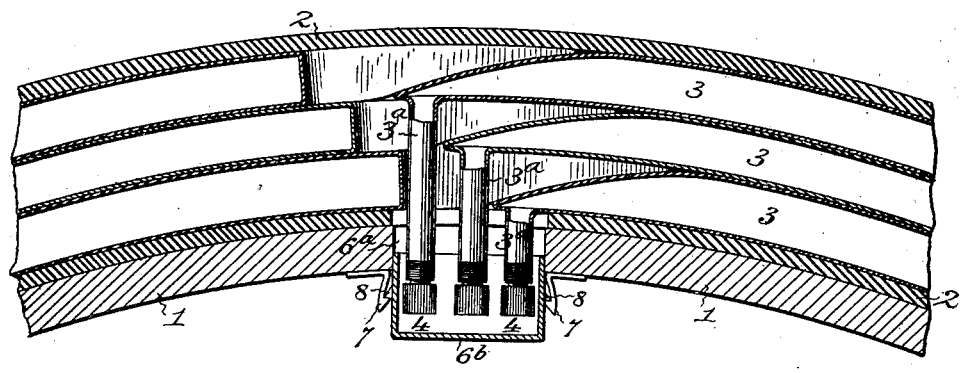
Figure 7:
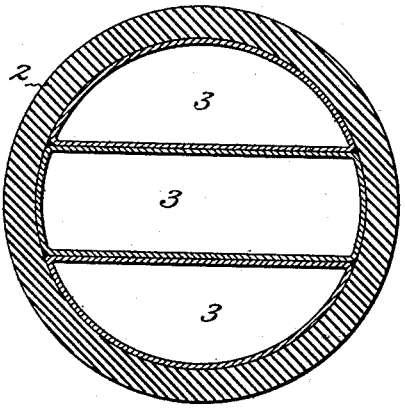
Figure 8:
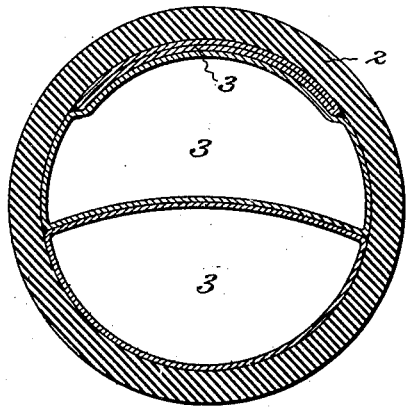

Figure 1 is a perspective view of one of the inner subdividing-tubes not inflated. Fig. 2 is a view in longitudinal section of a segment of a wheel constructed in accordance with our invention, showing the rim, the outer tire, and series of three inner subdividing-tubes each inflated and provided with a nipple. Fig. 3 is a transverse section of Fig. 2, showing each of the three subdividing-tubes inflated, with sufficient loose material in each tube, the tubes being folded upon each other, to give each the diameter when fully expanded of the inner diameter of the outer tire. Fig. 4 is a view similar to Fig. 2, but showing the outer one of the series of inner subdividing-tubes collapsed by puncture and the expansion of the remaining tubes to a degree sufficient to fill the area in cross-section of the outer tire, the said collapsed outer subdividing-tube being crowded between the inner wall of the outer tire and the outer portion or wall of the second inner subdividing-tube, a reinforce being thus effected, as before explained. Fig. 5 is a view similar to Fig. 1, but showing one of a series of inner subdividing-tubes made of elastic material. Fig. 6 is a view similar to Fig. 2, but showing the use of three elastic inner subdividing-tubes. Fig. 7 is a transverse section through the outer tire and three inner subdividing elastic tubes, showing the equal inflation of each of said tubes. Fig. 8 is a view similar to Fig. 7, showing the outer one of the series of inner elastic subdividing-tubes collapsed by puncture and the expansion of the remaining and elastic tubes to an extent sufficient to fill the entire inner cross-sectional area of the outer tire, the collapsed elastic tube forming a reinforce.

Similar numerals indicate similar parts in the several figures.

1 shows a section of the rim of the wheel of any ordinary or approved construction or material.

2 is the outer tire, which also may be of known structure and of any material adapted to the purpose. 3 3 3 show the inner subdividing-tubes, preferably made of this inelastic material, although they may be elastic, if desired. Each of the subdividing-tubes 3 is provided with a valved nipple $3^a$, having a screw-cap 4. Each of the tubes 3, preferably at the end to which its nipple is attached, is tapered or beveled, as shown at 5, while the opposite end of said tube is similarly but reversely tapered or beveled, as seen at $5^a$, and provided with a slot 6. In Fig. 1 the tube 3 is shown uninflated, and it will be understood that when inflated its ends will assume equally with the rest of the tube more of a rounded formation than that indicated in said figure, but that the ends of the tube by reason of their formation will overlap or fit together, substantially as seen in Fig. 2. The purpose of the slot 6 is to allow the nipple $3^a$ of one tube 3 to pass through the adjacent tube 3 and to permit the ends of the several tubes to be brought and fitted together, so as to produce an assemblage, as clearly seen in Fig. 2.

The several inner subdividing-tubes 3 having been each inflated, and they occupying the assembled position seen in Fig. 2, and the nipples $3^a$ having been closed by the caps 4, the series of nipples are inclosed and concealed by means of a box or sleeve $6^b$. This is slipped into the hole or cavity $6^a$, formed in the rim 1, the box or sleeve being held to the rim in any suitable manner. As here shown, a series of spring-hooks 7 are provided, which engage angular projections 8, formed upon the box $6^b$. Any other convenient mode of attachment may be employed.

Fig. 3 shows the three inner tubes each inflated to a substantially equal degree, while Fig. 4 shows the outer one of the inner subdividing-tubes collapsed and serving as a reinforce, Figs. 3 and 4 also indicating the folding of the several tubes upon each other or a surplusage of material to provide for further expansion, it being enough in the event of the puncture of two tubes to allow the remaining tube to fill the entire area of the outer tire. The pressure of air put upon each of said inner tubes is such that any one of said tubes shall, in the event of the puncture of the other two, be enough to cause the full expansion of the remaining tube, and thus preserve the integrity of the tire.

While it has been assumed that the repair of the wheel in the event of puncture is under our invention automatic, it is obvious that the reinflation of any one of the subdividing-tubes which may have collapsed by puncture may, on repair, in a manner at present well known, be readily accomplished by applying the air-pump to the nipple of the tube.

The several tubes 3 are introduced to the outer tire through the hole or cavity $6^a$ in any convenient manner and may be readily removed for purposes of repair. The cavity in the outer tire may correspond with that $6^a$ in the rim or be made, as heretofore, longer and laced or otherwise closed.

While our invention automatically effects a repair sufficient to enable the wheel to perform efficient service, the rider may at his convenience repair and reinflate the punctured tube, and thus restore normal pressure. A principal advantage of our invention consists in the fact that the wheel cannot be entirely disabled as long as one of the inner subdividing-tubes remains intact, there being at all times under such circumstances means within the tire—i. e., enough available pressure—to prevent total collapse, and although one or even two of the inner subdividing-tubes may become punctured, yet the rider may go a long distance before stopping to repair and choose a convenient opportunity for doing so, there being under our invention no possibility of complete breakdown of the tire while one of the series of inner subdividing-tubes remains unpunctured and therefore capable of expansion to automatically restore to a sufficient extent the integrity of the tire.

Figs. 5, 6, 7, and 8 show the adaptation of our invention to elastic inner subdividing-tubes. It will be understood that the elastic material of which each inner subdividing-tube is made will be of sufficient thickness to allow of its expansion to substantially the full inner area of the outer tire, and it will be seen that in the said figures a thickness of tube is shown greater than in Figs. 1 to 4, inclusive, in which inelastic material is represented.

Our improvement is capable of various modifications in construction without departing from the invention herein claimed. For instance, we do not limit ourselves to the number of inner subdividing-tubes employed or to the construction of the valved nipple or to that of the means employed for concealing the series of nipples.

Our invention does not contemplate the means for inserting the inner subdividing-tubes to or removing them from the outer tire, any well-known or approved means for such purposes being available.

Having described our invention, we claim—

1. In a pneumatic tire, an inner tube therefor, having beveled ends, a valve-stem at one end, and a slot at the other, substantially as described.

2. In a pneumatic-tired wheel, the combination of a rim, an outer tubular tire to which said rim is fitted, a series of inner subdividing-tubes, each one of which is, when inflated, substantially equal in area in cross-section to the inner cross-sectional diameter of the outer tire, each of said tubes having beveled and lapping ends, a nipple at one of said ends and a slot at the other, the arrangement and assemblage being substantially as described for the purposes set forth.

3. In a pneumatic-tired wheel, the combination of a rim, an outer tubular tire to which said rim is fitted, a series of inner subdividing-tubes, each one of which is, when inflated, substantially equal in area in cross-section to the inner cross-sectional diameter of the outer tire, each of said tubes having beveled and lapping ends, a nipple at one of said ends and a slot at the other, and a removable box or sleeve for covering the ends of the nipples, the arrangement and assemblage being substantially as described and for the purposes set forth.

4. In a pneumatic-tired wheel, the combination of a rim, an outer tubular tire to which said rim is fitted, a series of inner subdividing-tubes, each one of which is, when inflated, substantially equal in area in cross-section to the inner cross-sectional diameter of the outer tire, each of said tubes having beveled and lapping ends, a nipple at one of said ends and a slot at the other, and a removable box or sleeve for covering the ends of the nipples, projections 8 on the box, and spring-hooks 7 on the rim, the arrangement and assemblage being substantially as described and for the purposes set forth.

In testimony whereof we have hereunto set our hands and seals.

JOHN B. MAHANA. [L. S.]
ADRIAN A. POMPE. [L. S.]

Witnesses:
E. F. CARPENTER,
D. W. HEWETT.